US006746829B2

(12) United States Patent
Hashiguchi

(10) Patent No.: US 6,746,829 B2
(45) Date of Patent: Jun. 8, 2004

(54) THERMAL DEVELOPMENT SYSTEM AND APPARATUS

(75) Inventor: Akihiro Hashiguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/076,447

(22) Filed: Feb. 19, 2002

(65) Prior Publication Data

US 2002/0114631 A1 Aug. 22, 2002

(30) Foreign Application Priority Data

Feb. 20, 2001 (JP) .................................... P2001-043588

(51) Int. Cl.[7] .......................... G03C 5/16; G03G 15/00; G01D 15/00

(52) U.S. Cl. ....................... 430/350; 430/349; 399/389; 377/20; 377/24; 377/25

(58) Field of Search ................................ 430/350, 349; 399/190, 198, 252, 384, 389; 377/20, 24, 25; 396/364, 568

(56) References Cited

U.S. PATENT DOCUMENTS

| | | | | |
|---|---|---|---|---|
| 5,506,661 A | * | 4/1996 | Hanzawa | 355/209 |
| 6,262,756 B1 | * | 7/2001 | Kashino et al. | 347/215 |

FOREIGN PATENT DOCUMENTS

| | | |
|---|---|---|
| JP | 2000-241928 | 9/2000 |

* cited by examiner

*Primary Examiner*—Thorl Chea
(74) *Attorney, Agent, or Firm*—Sughrue Mion, PLLC

(57) ABSTRACT

In a thermal developing method for continuously and thermally developing thermal developing sheets which have a latent image formed thereon by exposure and various sizes, a minimum temperature recovery time required for thermally developing a next thermal developing sheet is determined from physical information about a thermally developed sheet, and the next thermal developing sheet is started to be developed after the minimum temperature recovery time passes.

10 Claims, 4 Drawing Sheets

THERMAL DEVELOPMENT SYSTEM AND APPARATUS

BACKGROUND OF THE INVENTION

1. Field of the Invention

The present invention relates to a continuous processing method and apparatus for sensitive materials having different sizes in a thermal developing apparatus.

2. Description of the Related Art

A continuous process in the thermal developing apparatus has conventionally been carried out in a newspaper publishing company. In that case, the process has been a continuous process for equal sized sensitive materials.

Moreover, a process for sensitive materials having various sizes has conventionally been carried out in the thermal developing apparatus. In that case, an offline process is carried out. More specifically, in the case in which a sensitive material having a different size is to be thermally developed after one sensitive material is completely developed thermally, a cassette including a sensitive material having a desired size is replaced with another cassette in the apparatus, thereby carrying out the thermal development.

In this respect, conventionally, it has not been necessary to carry out the continuous process for sensitive materials having various sizes in the thermal developing apparatus. Under the present circumstances, therefore, the same continuous process is not performed. In the invention, there is performed the continuous process for sensitive materials having various sizes in the thermal developing apparatus which has not been carried out. In that case, moreover, an image can be prevented from being deteriorated.

In the case in which thermal developing sheets (hereinafter referred to as sheets) which have the same size are to be continuously developed thermally, a change in the temperature of a heating member for heating the sheet and a change in a temperature distribution in the direction of the width of the sheet can be set to have such a level as not to deteriorate the quality of an image by maintaining the sufficient heat capacity of the heating member or an optimum temperature control method.

In the case in which sheets having different sizes (widths, lengths) are to be continuously developed thermally, however, the change in the temperature of the heating member, particularly, the change in the temperature distribution in the direction of the width of the sheet becomes remarkable even if the sufficient heat capacity is maintained in the heating member. Consequently, it has been found that the quality of an image is deteriorated. More specifically, according to the experiment carried out by the applicant, a countermeasure can be taken by increasing the heat capacity of the heating member in the case of the continuous process for sheets having different sizes and lengths, and the following problem arises in the case of the continuous process for sheets having different widths.

In the case in which the heating member is particularly constituted by a rotor such as a nip roller, it can be proposed that a heater is divided into a plurality of portions in the direction of the width of the heating roller and a plurality of temperature sensors are also provided in the direction of the width of the sheet to control the temperatures of the temperature sensor and the heater in respective corresponding portions independently of others. However, the apparatus becomes complicated and large-scaled so that a cost is increased.

In the case in which the heating member is a heating roller comprising a rotor such as a nip roller, particularly, it is preferable that the temperature sensor should be provided in a central portion in the direction of the width of the heating roller, that is, a sheet passage region because the temperature of the sheet can be detected accurately. However, the temperature sensor actually breaks down easily due to the jam of the sheet. Accordingly, the reliability of performance cannot be obtained. Therefore, the temperature sensor is not provided in the central portion in the direction of the width of the heating roller.

Consequently, the temperature sensor is not provided in the sheet passage region but on the outside of the sheet passage region on the heating roller such that the temperature sensor is not involved in a trouble such as the jam of the sheet. In consideration of the case in which the sheets having various sizes pass, moreover, the temperature sensor is provided in the vicinity of a passage region for a sheet having a maximum size outside the same passage region. An error between an actual temperature in the central portion of the sheet on the heating roller and a temperature detected by the temperature sensor in the vicinity of the passage region is previously measured to create a correction table, and the output value of the temperature sensor is corrected based on the correction table and is thus used. Consequently, the temperature in the central portion of the sheet can be detected without being involved in a trouble such as the jam of the sheet.

In the case in which the temperature sensor is thus provided in a very limited position on an end in the direction of the width of the sheet having a maximum size over the rotor such as a nip roller, the temperature of the heating roller which is reduced by the thermal developing process of the sheet can be detected accurately and a timing in which a reference temperature is recovered can be precisely taken because a space between the end of the sheet having a large size and the temperature sensor is small. Accordingly, the temperature control can be carried out accurately. A second sheet to be thus developed thermally after the execution of the accurate temperature control can be developed thermally with a satisfactorily high quality of an image irrespective of a size.

In the case of a sheet having a small size, however, a distance between a sheet end passing through the heating roller and the temperature sensor is great and a reduction in the temperature of the heating roller in a portion through which the sheet passes cannot be accurately detected by means of the temperature sensor provided on the end so that a temperature detected by the temperature sensor is higher. Thus, although the temperature in the central portion of the heating roller is actually low and is not recovered to an optimum developing temperature after the sheet having a small size passes, the temperature detected by the temperature sensor has already been recovered to the reference temperature. Therefore, an instruction for delivering a second sheet is given to start the thermal development. For this reason, the sheet is thermally developed in a state in which the temperature in the central portion in the direction of the width of the heating roller is still low. From the experiment carried out by the applicant, consequently, it has been found that the quality of an image is deteriorated in the central portion as compared with the end of the sheet.

SUMMARY OF THE INVENTION

In order to solve the problem, it is an object of the invention to provide a thermal developing method and apparatus in which the quality of an image can be prevented from being deteriorated in a central portion as compared with the end of a sheet, that is, the picture quality can be prevented from being deteriorated by a change in the temperature of a heating member when sheets having various sizes are to be continuously processed.

In order to attain the object, a first aspect of the invention is directed to a thermal developing method for continuously and thermally developing thermal developing sheets which have a latent image formed thereon by exposure and various sizes, wherein a minimum temperature recovery time required for thermally developing a next thermal developing sheet is determined from physical information about a thermally developed sheet, and the next thermal developing sheet is started to be developed after the minimum temperature recovery time passes.

A second aspect of the invention is directed to a thermal developing method for continuously and thermally developing thermal developing sheets which have a latent image formed thereon by exposure and various sizes, wherein minimum temperature recovery times required for thermally developing a next thermal developing sheet are determined from physical information about a thermally developed sheet and physical information about the next thermal developing sheet, respectively, and the next thermal developing sheet is started to be developed after either of the minimum temperature recovery times which is greater passes.

A third aspect of the invention is directed to the thermal developing method according to the first or second aspect of the invention, wherein the physical information is constituted by a combination of at least one of a dimension in a direction of a length, a dimension in a direction of a width, a thickness and a material of the thermal developing sheet.

A fourth aspect of the invention is directed to a thermal developing method for continuously and thermally developing thermal developing sheets which have a latent image formed thereon by exposure and various sizes, comprising the steps of determining a minimum temperature recovery time required for thermally developing a next thermal developing sheet from a size of a thermally developed sheet, measuring a time required until a rear end of the thermal developing sheet is completely developed and a tip of the next thermal developing sheet is then started to be developed, comparing the required time with the minimum temperature recovery time, and starting to develop the next thermal developing sheet if the required time is equal to or greater than the minimum temperature recovery time as a result of the comparison.

A fifth aspect of the invention is directed to a thermal developing method for continuously and thermally developing thermal developing sheets which have a latent image formed thereon by exposure and various sizes, comprising the steps of acquiring information about a size of a next thermal developing sheet before a developing process, measuring a time required until a rear end of the thermal developing sheet is completely developed and a tip of the next thermal developing sheet is then started to be developed, determining a minimum temperature recovery time required for thermally developing the next thermal developing sheet from a size of a thermally developed sheet and a size of the next thermal developing sheet, comparing the required time with the minimum temperature recovery time, and starting to develop the next thermal developing sheet if the required time is equal to or greater than the minimum temperature recovery time as a result of the comparison.

A sixth aspect of the invention is directed to a thermal developing apparatus for continuously and thermally developing thermal developing sheets which have a latent image formed thereon by exposure and various sizes, comprising sheet tip required time measuring means for measuring a time required until a rear end of the thermal developing sheet is completely developed and a tip of a next thermal developing sheet is then started to be developed, minimum temperature recovery time determining means for determining a minimum temperature recovery time required for thermally developing the next thermal developing sheet from a size of a thermally developed sheet, and comparing means for comparing the required time measured by the sheet tip required time measuring means with the minimum temperature recovery time determined by the minimum temperature recovery time determining means.

A seventh aspect of the invention is directed to a thermal developing apparatus for continuously and thermally developing thermal developing sheets which have a latent image formed thereon by exposure and various sizes, comprising sheet size information acquiring means for acquiring information about a size of a next thermal developing sheet before a developing process, sheet tip required time measuring means for measuring a time required until a rear end of the thermal developing sheet is completely developed and a tip of the next thermal developing sheet is then started to be developed, minimum temperature recovery time determining means for determining a minimum temperature recovery time required for thermally developing the next thermal developing sheet from a size of a thermally developed sheet and a size of the next thermal developing sheet, and comparing means for comparing the required time measured by the sheet tip required time measuring means with the minimum temperature recovery time determined by the minimum temperature recovery time determining means.

An eighth aspect of the invention is directed to the thermal developing apparatus according to the sixth or seventh aspect of the invention, wherein the next thermal developing sheet is started to be developed if the required time is equal to or greater than the minimum temperature recovery time as a result of the comparison of the comparing means.

Thus, according to the invention, by having a time required for the heating member to recover to such a level that a picture quality is not deteriorated after a thermally developing sheet of each of various predetermined sizes is thermally developed, the information about the size of the sheet as a parameter is obtained to set the time required for causing the next thermal developing sheet to stand by for each size. Also in the case in which the sheets having various sizes are to be continuously processed, accordingly, the thermal development can be carried out without deteriorating the picture quality due to a change in the temperature of the heating member.

DESCRIPTION OF THE PREFERRED EMBODIMENTS

An embodiment of the invention will be described below with reference to the drawings.

Figure 4:
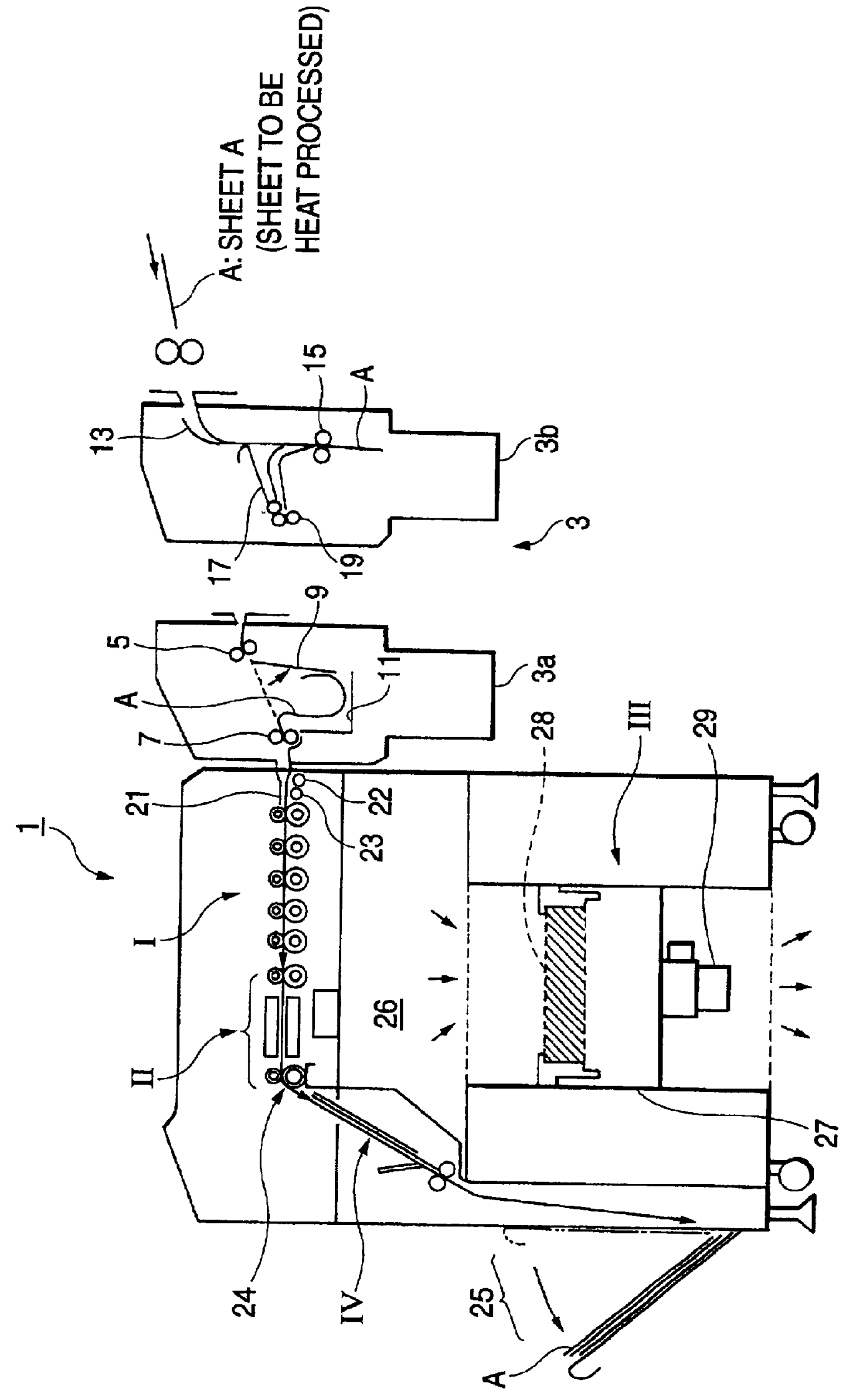
FIG. 4 is a view showing the schematic structure of a thermal developing apparatus intended for the invention.

FIG. 4 is a view showing the schematic structure of a thermal developing apparatus intended for the invention.

A heat processing apparatus 1 serves to heat a sheet A to be heat treated (which will be hereinafter referred to as a sheet A), and the sheet A has various sizes in the directions of a width and a length. For example, there is a plate making recording material having a large size and a small thickness, more specifically, a thermal developing photosensitive material described in JP-2000-241928A filed by the applicant wherein an image forming layer containing at least (a) non-photosensitive organic silver salt, (b) photosensitive silver halide, (c) a reducing agent and (d) a nucleating agent is provided on a support, and 50 weight % or more of a binder of the image forming layer is formed by using a polymer latex having a glass transfer temperature of −30° C. to 40° C., the image forming layer is applied on the support and is dried and heat treatment is then carried out at a film surface temperature of 30° C. to 70° C. and a temperature which is equal to or lower than the glass transfer temperature of the support.

The heat processing apparatus 1 comprises a preheating portion I, a developing portion II, an exhaust portion III and a slow cooling portion IV as a main structure.

A conveyer 3 to be an interface for feeding, to the heat processing apparatus 1, a sheet A exposed and scanned in a plotter which is not shown and having a latent image formed thereon is connected to the heat processing apparatus 1. The conveyer 3 comprises a conveyer 3*a* capable of being used for the sheet A having A1 to A5 sizes, for example, and serving to reduce and regulate the feeding speed of the sheet from the plotter, and a conveyer 3*b* capable of being used for the sheet A having the sizes A1 to A5 and turning the sheet A over. The conveyers 3*a* and 3*b* are properly connected to the heat processing apparatus 1 according to the purpose.

The conveyer 3*a* includes an inlet side nip roller 5 which is synchronous with the sheet delivery speed of the plotter, an outlet side nip roller 7 which is synchronous with the sheet delivery speed of the heat processing apparatus 1 at a lower speed than that of the inlet side nip roller 5, and a guide plate 9 provided on a delivery path therebetween which is rockable downward. In the conveyer 3*a*, when the sheet A delivered by the inlet side nip roller 5 reaches the outlet side nip roller 7 and is held therein, the guide plate 9 is rocked downward and the sheet A is loosened like a loop in a housing portion 11 so that a difference in a sheet delivery speed between the heat processing apparatus 1 and the plotter is absorbed.

Moreover, the conveyer 3*b* includes a vertical guide portion 13 for delivering the sheet A fed from the plotter in an almost vertically downward direction, an inversion nip roller 15 provided on the lower end of the vertical guide portion 13, a horizontal guide portion 17 connected to the almost center of the vertical guide portion 13, and an outlet side nip roller 19. In the conveyer 3*b*, the sheet A fed from the plotter is bent by the vertical guide portion 13 and is delivered in a downward direction by means of the inversion nip roller 15. When the rear end of the sheet A reaches a predetermined height, the sheet A separates from the vertical guide portion 13 by a self-weight and falls over the horizontal guide portion 17. In this state, the inversion nip roller 15 is inverted so that the sheet A is delivered along the horizontal guide portion 17 and is held in the outlet side nip roller 19. Consequently, the sheet A is turned over and fed to the heat processing apparatus 1.

Thus, the sheet A having the delivery speed regulated or turned over by the conveyer 3 is fed from a sheet feeding port 21 of the heat processing apparatus 1 and first passes through the preheating portion I. The preheating portion I is constituted by plural pairs of nip rollers to be heat rollers, and preheats the sheet A and raises a temperature to a thermal developing temperature.

The sheet A having the temperature raised to the thermal developing temperature by the preheating portion I is subsequently delivered to the developing portion II. In the developing portion II, one of nip rollers 24 is constituted by a heating roller. The heating roller 24 may include a heat generator such as a nichrome wire in an axial direction therein or a heat pipe may be embedded in a ceramic heater of a self heat generating type.

A temperature sensor (not shown) for detecting the temperature of the heating roller 24 is provided in the vicinity of the sheet end of the heating roller 24 over the heating roller 24. A correlation between the temperature detected by the temperature sensor and the temperature of the central portion in an axial direction on the surface of the heating roller 24 is previously obtained prior to thermal development and a (correlation) table is created. Based on the temperature detected by the temperature sensor, consequently, it is possible to estimate the temperature of the central portion in the axial direction on the surface of the heating roller 24 which is to be detected. Therefore, it is possible to grasp the temperature of the central portion in the axial direction on the surface of the heating roller 24 without coming in contact with the surface of the heating roller 24.

As shown in FIG. 4, the inside of the heat processing apparatus 1 is partitioned with the preheating portion I and the developing portion II formed like chambers. An air sucking portion communicating with the outside which is not shown is opened in a chamber portion 26. Moreover, an exhaust path 27 communicating with the outside is coupled to the chamber portion 26. The exhaust path 27 has a deodorizing filter 28 and an exhaust fan 29 provided sequentially from the inside of a chamber portion 26. A gas generated from the preheating portion I and the developing portion II is sucked from the chamber portion 26 into the exhaust path 27, and passes through the deodorizing filter 28 and is cleaned, and is then discharged to the outside of the apparatus through the exhaust fan 29.

According to the invention, moreover, a longitudinal end detecting sensor 22 for detecting an end in the direction of the length of the sheet A and a transverse end detecting sensor 23 for detecting an end in the direction of the width of the sheet A are provided in the vicinity of the inlet of the heat processing apparatus 1, respectively. Both sensors can be implemented by using a known end detector such as a photocoupler, a dielectric detector or a microswitch. As a matter of course, the longitudinal end detecting sensor 22 and the transverse end detecting sensor 23 do not need to be provided in the vicinity of the inlet of the heat processing apparatus 1 but may be provided on the conveyer 3*a* and 3*b* sides.

Figure 1:
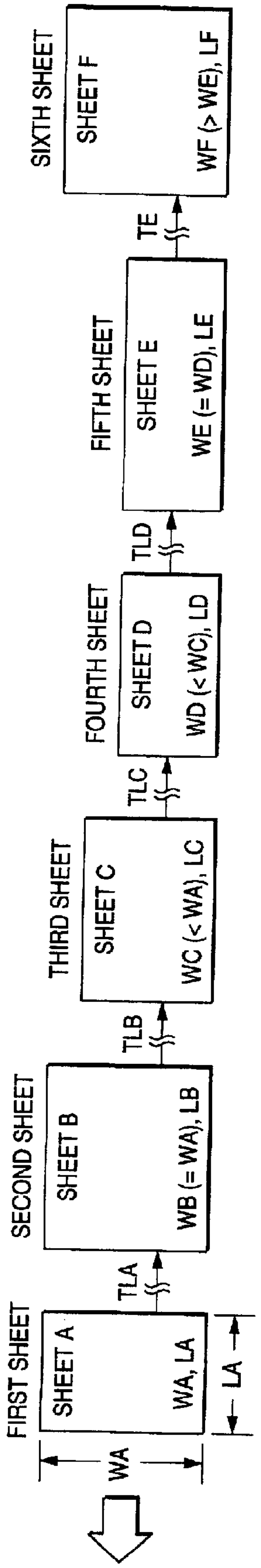
FIG. 1 is a diagram showing an example of an order for continuously processing sheets having a plurality of different sizes.

For example, it is assumed that sheets having various sizes are continuously processed in order shown in FIG. 1. More specifically, in FIG. 1, WA represents a dimension in the direction of a width and LA represents a dimension in the direction of a length (delivery) in a first sensitive material sheet A, WB represents a dimension in the direction of a width (here, WA=WB) and LB represents a dimension in the direction of a length in a second sensitive material sheet B, WC represents a dimension in the direction of a width (WC<WA) and LC represents a dimension in the direction of a length in a third sensitive material sheet C, WD represents a dimension in the direction of a width (WD<WC) and LD represents a dimension in the direction of a length in a fourth sensitive material sheet D, WE represents a dimension in the direction of a width (WE=WD) and LE represents a dimension in the direction of a length in a fifth sensitive material sheet E, and WF represents a dimension in the direction of a width (WF>WE) and LF represents a dimension in the direction of a length in a sixth sensitive material sheet F. Moreover, the respective dimensions in the direction of the length are assumed to be LA≠LB≠LC≠LD≠LE≠LF.

In the drawing, TLA represents a minimum standby time (a minimum time required for temperature recovery) determined by the length of the sheet A for the sheet B to be processed next to the sheet A, and TLB represents a minimum standby time determined by the length of the sheet B for the sheet C to be processed next to the sheet B, and so forth.

Figure 2:
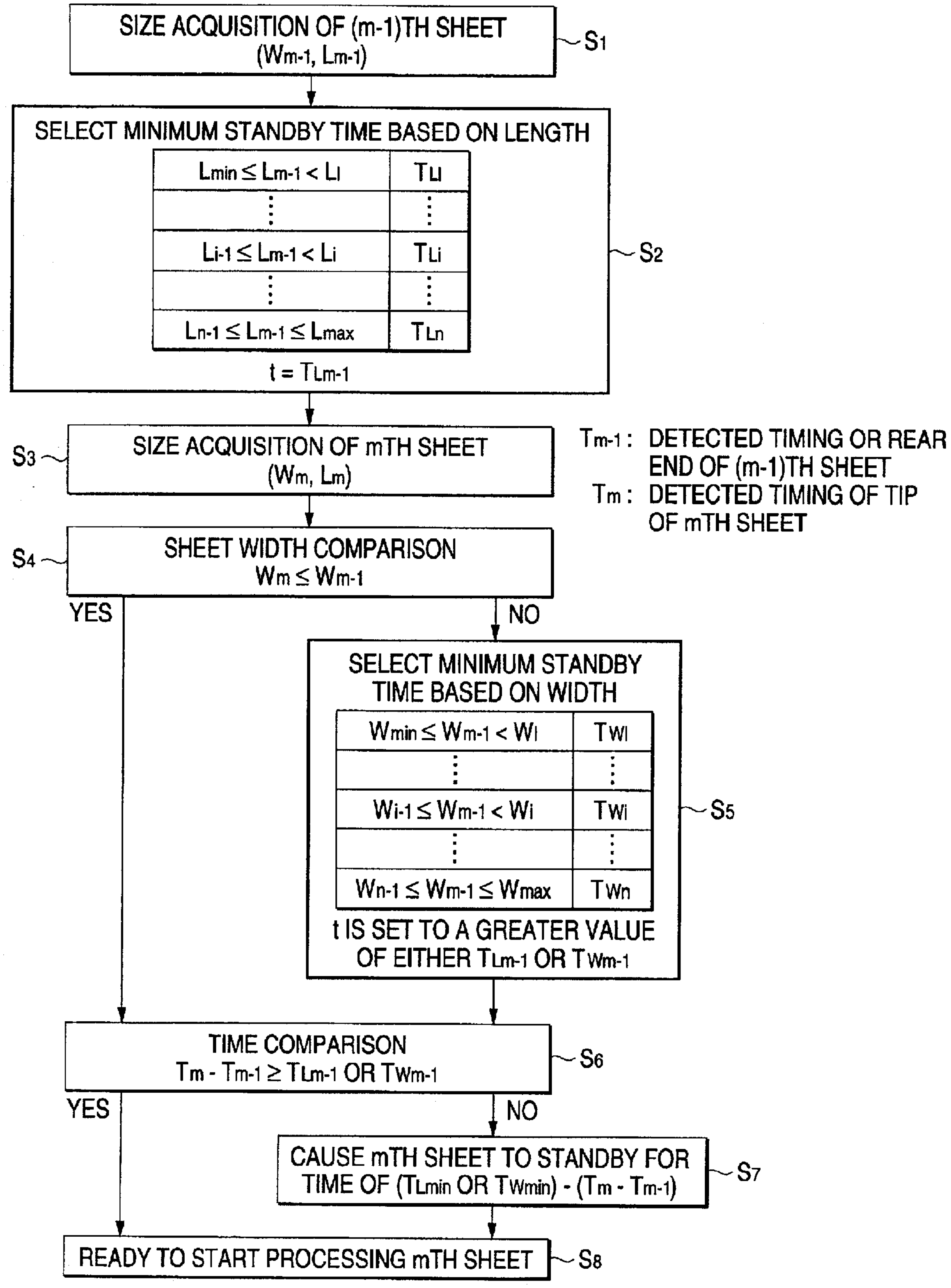
FIG. 2 is a diagram showing a sequence for determining the minimum standby time of a next thermal developing sheet according to a first embodiment of the invention.

FIG. 2 shows a sequence for determining the minimum standby time of a next thermal developing sheet. If the sheet B to be next developed thermally is an mth sheet, the last (previous to the sheet B) sheet A is an (m−1)th sheet. The (m−1)th sheet A is thermally developed in the state of temperature stability of a processing machine. In that case, information about the size of the sheet A (e.g., length Lm−1 and width Wm−1) is acquired from an exposing machine, the processing machine or a sensor (step S1). The minimum standby time (a minimum time required for temperature recovery) TLA is acquired from a versus-length minimum standby time table by the length of the sheet A, for the sheet B to be next processed.

The versus-length minimum standby time table is created in a following way. At first, all variations of the sheet sizes in the direction of the length among the sheets that are planned to be used with this apparatus are classified into n steps of groups according to the size in the direction of the length. For example, as illustrated in step S2 of FIG. 2, in the first group a lower length Lmin of a sheet is less than or equal to a length Lm−1 of sheet m−1, and the length Lm−1 is less than upper length L1 of a sheet. A similar relationship exists for the remaining groups 2 through n. Then stored data is obtained by measuring a recovery time (a minimum standby time based on the length) required from passage through a heating device (a heating roller) to recovery (of the heating device) to a developing temperature for each group (e.g., TL1 . . . TLi . . . TLn as the group developing temperatures illustrated in FIG. 2). For example, for the first group, developing temperature TL1 is chosen based on the above-described length.

Accordingly, if the sheet (m−1) which is being thermally developed has a length Lm−1 that corresponds to a group having lengths of L(i−1) to Li (such that Li−1 is less than or equal to Lm−1, and Lm−1 is less than or equal to Li) in the versus-length minimum standby time table of a step S2, the minimum standby time is set to TL1 and the thermal developing temperature is recovered after the minimum standby time TL1 passes. Therefore, the sheet m to be next developed may be fed to the heating device.

Similarly, a versus-width minimum standby time table is created for the size in the direction of a width. More specifically, the versus-width minimum standby time table is created in a following way. At first, all variations of the sheet sizes in the direction of the width among the sheets that are planned to be used with this apparatus are classified into n steps of groups according to the size in the direction of the width. For example, as illustrated in step S5 of FIG. 2, in the first group a lower width Wmin of a sheet is less than or equal to a width Wm−1 of sheet m−1, and the width Wm−1 is less than upper width W1 of a sheet. A similar relationship exists for the remaining groups 2 through n. Then stored data is obtained by measuring a recovery time (a minimum standby time based on the width) required from passage through a heating device (a heating roller) to recovery (of the heating device) to a developing temperature for each group (e.g., TW1 . . . TWi . . . TWn as the group developing temperatures illustrated in FIG. 2). For example, for the first group, developing temperature TW1 is chosen based on the above-described length.

The versus-width minimum standby time table thus created is used in a step S5.

Accordingly, if the sheet (m−1) which is being thermally developed corresponds to a group having widths of W(n−1) to Wmax in the versus-width minimum standby time table of the step S5, the minimum standby time is set to TWn and the thermal developing temperature is recovered after the minimum standby time TWn passes. Therefore, the sheet m to be next developed may be fed to the heating device.

Returning to the explanation of step S2, the minimum standby time TLA for the sheet B to be next processed is acquired from the versus-length minimum standby time table and the rear end of the sheet A is then detected by the longitudinal end detecting sensor 22 of the processing machine (Tm−1: detecting point of time), and the tip of the sheet B is subsequently detected (Tm: detecting point of time) to calculate a time (Tm−T(m−1)) required until the rear end of the sheet A passes and the tip of the sheet B then arrives.

Next, information about the size of the mth sheet B is acquired from the exposing machine, the processing machine or the sensor (step S3).

Before the sheet B is thermally developed, a width Wm of the sheet B acquired from the transverse end detecting sensor 23 is compared with a width Wm−1 of the sheet A (step S4).

As a result of the comparison, if the width Wm−1 of the sheet A is equal to or greater than the width Wm of the sheet B, the processing proceeds to a step S6. If the width Wm−1 of the sheet A is smaller than the width Wm of the sheet B, the processing proceeds to the step S5.

At the step S5, a versus-width minimum standby time TWm−1 for a next sheet is obtained from a sheet A(m−1) which is being thermally developed based on the versus-width minimum standby time table, and the versus-width minimum standby time TWm−1 or the versus-length minimum standby time TLm−1 obtained earlier which is greater is selected and the processing then proceeds to the step S6.

At the step S6, a comparison is carried out as to whether the time (Tm−T(m−1)) required until the rear end of the sheet A passes through the sensor and the tip of the sheet B then reaches the sensor is equal to or greater than the versus-length minimum standby time TLm−1 or the versus-width minimum standby time TWm−1. If the time (Tm−T(m−1)) is smaller than the minimum standby time, the sheet B is not thermally developed but is caused to stand by until the time (Tm−T(m−1)) exceeds the minimum standby time (step S7). When the time (Tm−T(m−1)) is equal to or greater than the minimum standby time, the processing proceeds to a step S8.

At the step S8, the thermal developing process for the sheet B is started.

While the continuous process for the sheets A and B having different sizes has been described above, a continuous process for the sheets C, D and E is carried out in the same manner. More specifically, the continuous process is carried out from the step S4 to the step S6 in the flow of FIG. 2.

On the other hand, since the sheet F has a greater width than the width of the last sheet E, it is necessary to recover from a reduction in a temperature in the direction of the width of the sheet in a heating member. Therefore, the processing proceeds from the step S4 to the step S5 in the flow of FIG. 2 and the number of flows to see the versus-width minimum temperature recovery time table is increased. Accordingly, the versus-width minimum temperature recovery time TWE of the sheet E is selected from the table and the minimum temperature recovery time TLE based on the length of the sheet E is compared with TWE, and the greater minimum recovery time is selected to be the minimum standby time TE. If the time required until the tip of the sheet F reaches a detecting position after the rear end of the sheet E passes is equal to or greater than TE, the thermal developing process for the sheet F is started.

Moreover, if the time required until the tip of the sheet F reaches the detecting position after the rear end of the sheet E passes is smaller than TE, the sheet F is caused to stand by until the time becomes equal to or greater than TE. After the time becomes equal to or greater than TE, the thermal developing process for the sheet F is started.

According to the embodiment, the minimum temperature recovery time required for thermally developing a next thermal developing sheet is determined based on physical information about the thermal developed sheet and the next thermal developing sheet. Therefore, the process does not depend on the temperature sensor and the quality of an image in a central portion can be prevented from being deteriorated as compared with the end of the sheet also during the continuous process for the sheets having various sizes.

Figure 3:
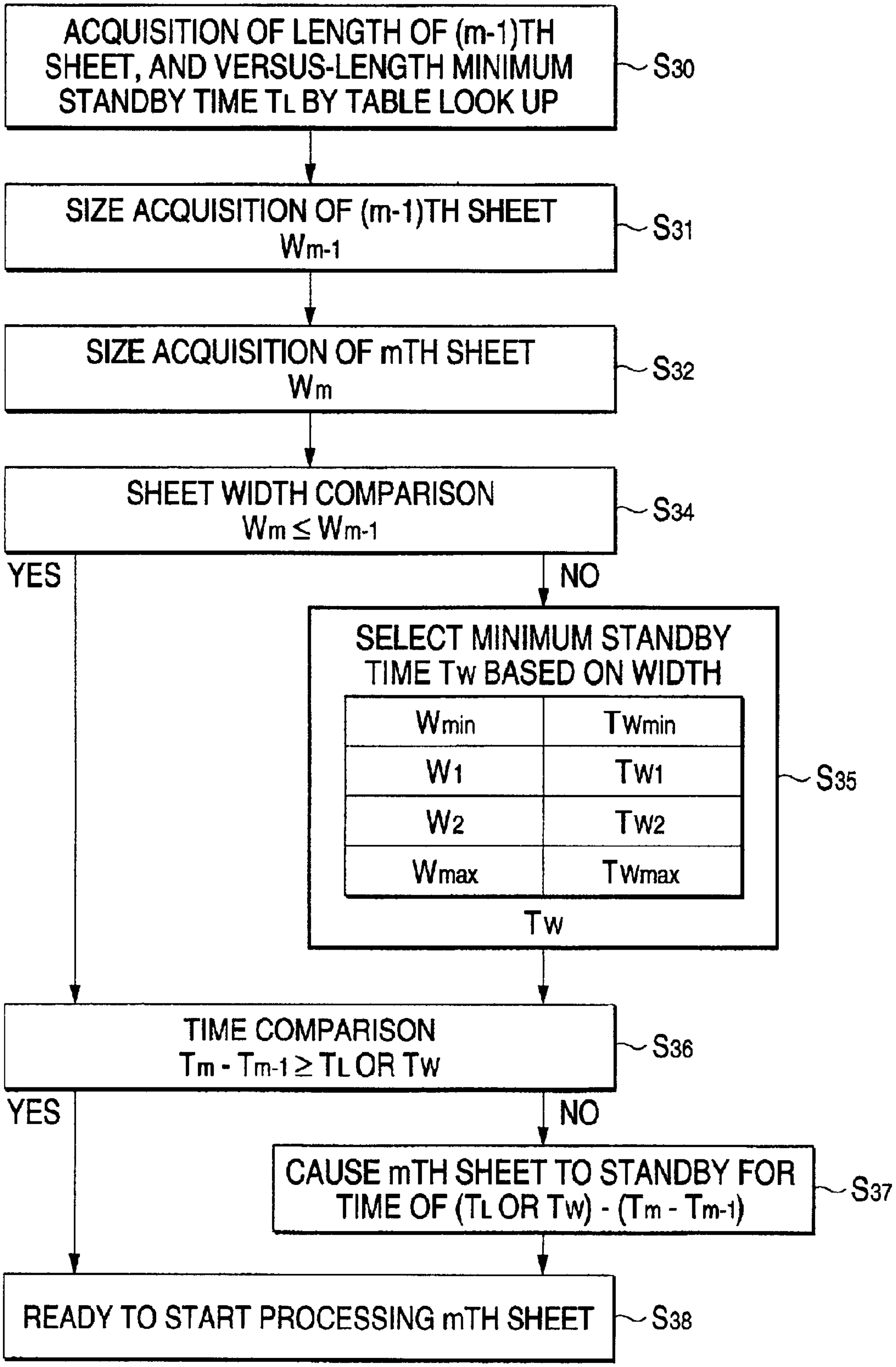
FIG. 3 is a diagram showing a schematic sequence according to a second embodiment of the invention.

FIG. 3 shows a sequence according to a second embodiment of the invention.

The schematic sequence according to the second embodiment is a simplified sequence which can be taken in the case in which the heat capacity of a heating member is sufficiently great or the case in which a minimum standby time in the direction of the length of a sheet does not need to be selected by the optimization of temperature control.

More specifically, assume that a sheet B to be next developed thermally is an mth sheet and a just previous sheet A is an (m−1) th sheet in FIG. 3, at a step S30, the length of the (m−1)th sheet A is acquired from an exposing machine, a processing machine or a length direction sensor and then the versus-length minimum standby time TL is acquired in a manner similar to the acquisition of TLA in the first embodiment, using the length of the (m−1)th sheet.

Then the width of the (m−1)th sheet A is acquired from an exposing machine, a processing machine or a width direction sensor at a step S31.

At a step S32, similarly, the width of the mth sheet B to be next processed is acquired from the exposing machine, the processing machine or the width direction sensor.

At a step S34, a width Wm of the sheet B is compared with a width Wm−1 of the sheet A. If an inequality the width Wm>the width Wm−1 holds, the processing proceeds to a step S35. If an inequality the width Wm≦ the width Wm−1 holds, the processing proceeds to a step S36.

A versus-width minimum standby time table in the step S35 is a simple table which can be applied to the case in which the kind of the width of the sheet is limited. In the versus-width minimum standby time table, a versus-width minimum standby time TW for the sheet B is obtained from the width Wm−1 of the sheet A. The greater value between the versus-width minimum standby time TW and a versus-length minimum standby time TL obtained earlier is selected to be a final minimum standby time, and the processing then proceeds to the step S36.

At the step S36, a comparison is carried out as to whether a time (Tm−T(m−1)) required until the rear end of the sheet A passes through the sensor and the tip of the sheet B then reaches the sensor is equal to or greater than the obtained final minimum standby time, which is equal to either the versus-length minimum standby time TL or the versus-width minimum standby time TW. If the time (Tm−T(m−1)) is equal to or greater than the minimum standby time, the processing proceeds to a step S38. If the time (Tm−T(m−1)) is smaller than the minimum standby time, the sheet B is not thermally developed but is caused to stand by until the time (Tm−T(m−1)) exceeds the minimum standby time (step S37). When the time (Tm−T(m−1)) becomes equal to or greater than the minimum standby time, the processing proceeds to the step S38.

At the step S38, the thermal developing process for the sheet B is started.

Thus, if the constant TL obtained by an experiment is set to be the minimum standby time and the minimum standby time in only the direction of the width is selected, it is possible to obtain, by the simple flow, the same effects as those in the first embodiment in which the processing does not depend on the temperature sensor and the quality of an image is not deteriorated also during the continuous process for sheets having various sizes.

While the information about the size of the sheet is separated for the size in the direction of a length and the size in the direction of a width and each table is provided in the embodiments described above, a table for an area may be provided by setting an area to be a product of the length and the width as one parameter. More specifically, a standby time for a next sheet may be taken from the table for an area based on the area of a last sheet and the standby time may be increased if the area is great. Moreover, in the case in which a difference between the area of the last sheet and the area of the next sheet is very great, a predetermined measure may be taken.

While the area based on the length and width of the information about the size of the sheet is set to be one parameter in the embodiments described above, it is also possible to further provide a table in which the thickness of a sheet or the material of a sheet (particularly, a heat capacity per unit area) to be another information about the sheet is set to be a parameter.

More specifically, if the standby time is increased when the thickness of a just previous sheet is great or the heat capacity per unit area of the last sheet is large, fine control can be carried out still more.

Moreover, it is also possible to select the standby time for the just previous sheet or the standby time for the next sheet which is greater. For example, in the case in which the thickness of the next sheet or the heat capacity per unit area is great, a countermeasure cannot be taken in the standby time for the last sheet. Therefore, it is preferable that the developing temperature of the heating roller should be set to be higher within a tolerance to obtain the standby time for the next sheet.

The length, width, thickness and material of the sheet to be physical information about the sheet may be obtained by dedicated sensors provided in the apparatus respectively or may be set to be known information on the plotter side and may be read therefrom. In that case, only a longitudinal detecting sensor is provided in the apparatus and the moving distance, current position and moving time of a sheet can be easily calculated from the delivery speed and time of a motor.

As described above, according to the invention, in a thermal developing method for continuously and thermally developing thermal developing sheets which have a latent image formed thereon by exposure and various sizes, a minimum temperature recovery time required for thermally developing a next thermal developing sheet is determined from physical information about a thermally developed sheet, and the next thermal developing sheet is started to be developed after the minimum temperature recovery time passes. Consequently, it is possible to control a deterioration in a picture quality which is caused by a reduction in the temperature of a heating member due to a continuous process. In addition, it is possible to eliminate a wasteful standby time. Thus, a time required for the continuous process can be shortened.

What is claimed is:

1. A thermal developing method for continuously and thermally developing thermal developing sheets which have a latent image formed thereon by exposure and various sizes, wherein a minimum standby time required for thermally developing a sheet is acquired based on physical information about a thermally developed sheet, said physical information including at least one of size and material information, and a next thermal developing sheet is started to be developed after the minimum standby time passes, and pre-heating of said thermal development sheet is performed prior to thermally developing said thermal development sheet.

2. A thermal developing method according to claim 1, wherein the physical information comprises a combination of at least one of a dimension in a direction of a length, a dimension in a direction of a width, a thickness and said material information that comprises heat capacity per unit area.

3. A thermal developing method for continuously and thermally developing thermal developing sheets which have a latent image formed thereon by exposure and various sizes, wherein minimum temperature recovery times required for thermally developing a next thermal developing sheet are acquired based on physical information about a thermally developed sheet and physical information about the next thermal developing sheet, respectively, said physical information including at least one of size and material information, and the longer time of the minimum temperature recovery times is selected to be a minimum standby time and the next thermal developing sheet is started to be developed after the selected minimum standby time passes, and pre-heating of said thermal development sheet is performed prior to thermally developing said thermal development sheet.

4. A thermal developing method according to claim 3, wherein the physical information comprises a combination of at least one of a dimension in a direction of a length, a dimension in a direction of a width, a thickness and said material information that comprises heat capacity per unit area.

5. A thermal developing method for continuously and thermally developing thermal developing sheets which have a latent image formed thereon by exposure and various sizes, comprising the steps of:

acquiring a minimum standby time required for thermally developing a next thermal developing sheet based on a size of a thermally developed sheet;

measuring a time required until a rear end of the thermal developing sheet is completely developed and a tip of the next thermal developing sheet is then started to be developed;

comparing the required time with the minimum standby time; and starting to develop the next thermal developing sheet if the required time is equal to or greater than the minimum standby time as a result of the comparison, wherein pre-heating of said thermal development sheet is performed prior to thermally developing said thermal development sheet.

6. A thermal developing method for continuously and thermally developing thermal developing sheets which have a latent image formed thereon by exposure and various sizes, comprising the steps of:

acquiring information about a size of a next thermal developing sheet before a developing process;

measuring a time required until a rear end of the thermal developing sheet is completely developed and a tip of the next thermal developing sheet is then started to be developed;

acquiring a minimum standby time required for thermally developing the next thermal developing sheet based on a size of a thermally developed sheet and a size of the next thermal developing sheet;

comparing the required time with the minimum standby time; and starting to develop the next thermal developing sheet if the required time is equal to or greater than the minimum standby time as a result of the comparison, wherein pre-heating of said thermal development sheet is performed prior to thermally developing said thermal development sheet.

7. A thermal developing apparatus for continuously and thermally developing thermal developing sheets which have a latent image formed thereon by exposure and various sizes, comprising:

sheet tip required time measuring means for measuring a time required until a rear end of the thermal developing sheet is completely developed and a tip of a next thermal developing sheet is then started to be developed;

minimum standby time acquiring means for acquiring a minimum standby time required for thermally developing the next thermal developing sheet based on a size of a thermally developed sheet; and comparing means for comparing the required time measured by the sheet tip required time measuring means with the minimum standby time acquired by the minimum standby time acquiring means, wherein a means for heating pre-heats said thermal developing sheet prior to thermally developing said thermal developing sheet.

8. The thermal developing apparatus according to claim 7, wherein the next thermal developing sheet is started to be developed if the required time is equal to or greater than the minimum standby time as a result of the comparison of the comparing means.

9. A thermal developing apparatus for continuously and thermally developing thermal developing sheets which have a latent image formed thereon by exposure and various sizes, comprising:

sheet size information acquiring means for acquiring information about a size of a next thermal developing sheet before a developing process;

sheet tip required time measuring means for measuring a time required until a rear end of the thermal developing sheet is completely developed and a tip of the next thermal developing sheet is then started to be developed;

minimum standby time acquiring means for acquiring a minimum standby time required for thermally developing the next thermal developing sheet based on a size of a thermally developed sheet and a size of the next thermal developing sheet; and comparing means for comparing the required time measured by the sheet tip required time measuring means with the minimum standby time acquired by the minimum standby time acquiring means, wherein a means for heating pre-heats said thermal developing sheet prior to thermally developing said thermal developing sheet.

10. The thermal developing apparatus according to claim 9, wherein the next thermal developing sheet is started to be developed if the required time is equal to or greater than the minimum standby time as a result of the comparison of the comparing means.

* * * * *